United States Patent [19]

Hedquist et al.

[11] Patent Number: 4,586,454
[45] Date of Patent: May 6, 1986

[54] DISTANCE STICK

[76] Inventors: Ace H. Hedquist; George Spector, both of 233 Broadway, Rm. 3615, New York, N.Y. 10007

[21] Appl. No.: 634,815

[22] Filed: Jul. 26, 1984

[51] Int. Cl.⁴ ............................................ B60Q 11/00
[52] U.S. Cl. .............................. 116/28 R; 116/28 A; 248/293
[58] Field of Search ................. 116/28 A, 28 R, 35 R, 116/51, 52, 209, 46–49, 50, 53, 313, 319, 324; 350/97; 280/289 R; 248/231.7, 286, 293; 232/33–35, 37; 403/109, 393

[56] References Cited

U.S. PATENT DOCUMENTS

| | | | |
|---|---|---|---|
| 1,458,836 | 6/1923 | McDowell | 232/34 |
| 2,567,487 | 9/1951 | Kelly | 232/33 |
| 2,683,640 | 7/1954 | Mangine | 248/231.7 |
| 3,768,433 | 10/1973 | Dian et al. | 116/28 R |
| 3,982,771 | 9/1976 | Tropeano | 280/289 R |
| 4,038,935 | 8/1977 | Margiloff | 116/35 R |
| 4,116,154 | 9/1978 | Harris | 116/35 A |
| 4,270,721 | 6/1981 | Mainor, Jr. | 248/231.7 |
| 4,321,883 | 3/1982 | Ruppa | 116/35 A |
| 4,342,280 | 8/1982 | Ashworth | 116/202 |

FOREIGN PATENT DOCUMENTS

| | | | |
|---|---|---|---|
| 831646 | 1/1952 | Fed. Rep. of Germany | 116/35 R |
| 2659270 | 7/1978 | Fed. Rep. of Germany | 116/28 R |
| 273665 | 2/1951 | Switzerland | 248/286 |

*Primary Examiner*—Charles Frankfort
*Assistant Examiner*—W. Morris Worth

[57] ABSTRACT

A distance safety stick for a bicycle and the like is provided and consists of a guard arm and mounting device for supporting the guard arm in a horizontally disposed position at one side of the bicycle from which position the guard arm may be swung upwardly into a vertically retracted position. The guard arm has an arrow shaped reflector portion to indicate the bicycle presence to vehicles approaching from the front and rear. In a modified form the guard arm is adjustable.

4 Claims, 5 Drawing Figures

U.S. Patent  May 6, 1986  4,586,454
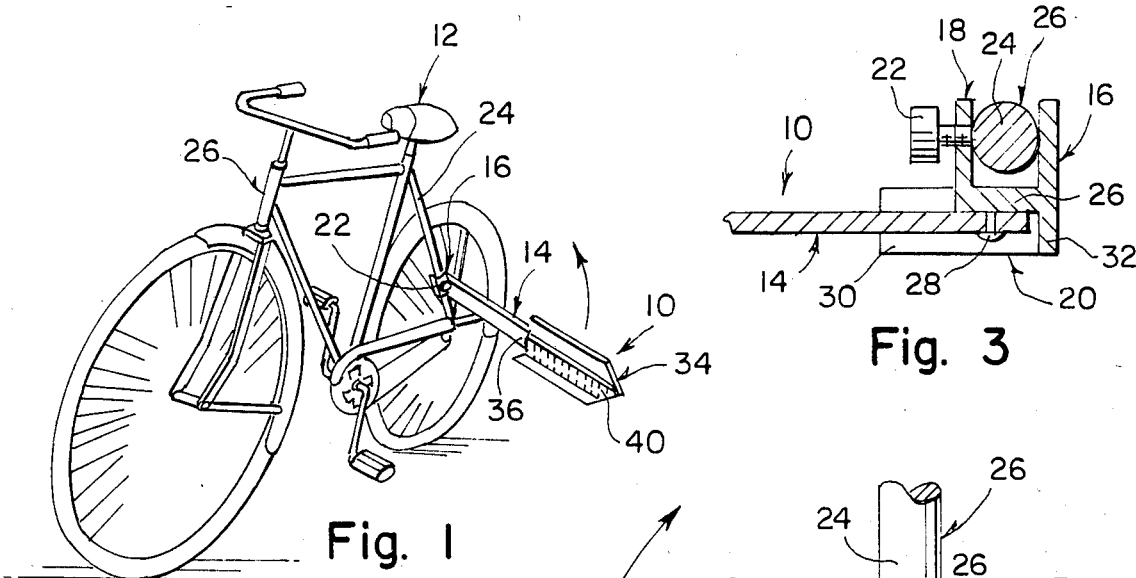
Fig. 1
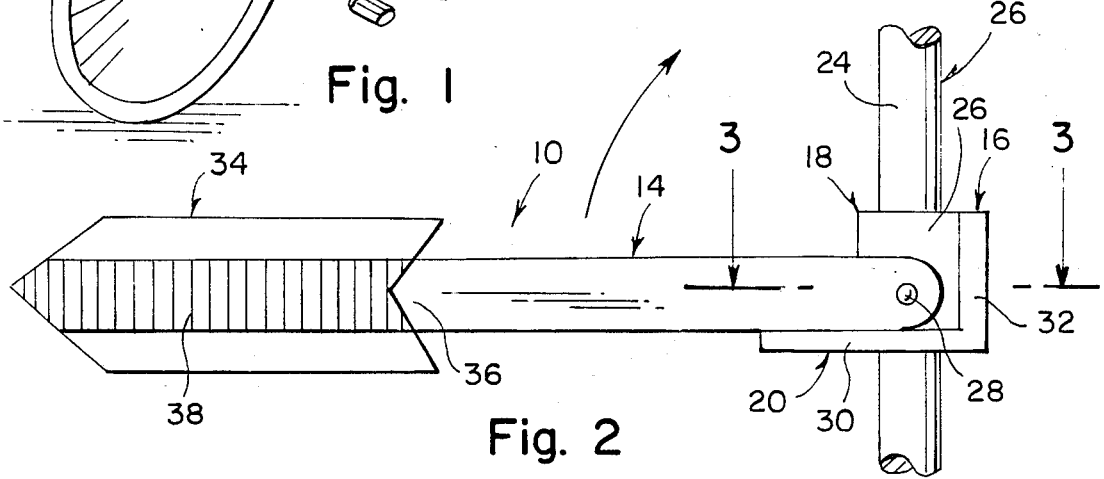
Fig. 2
Fig. 3
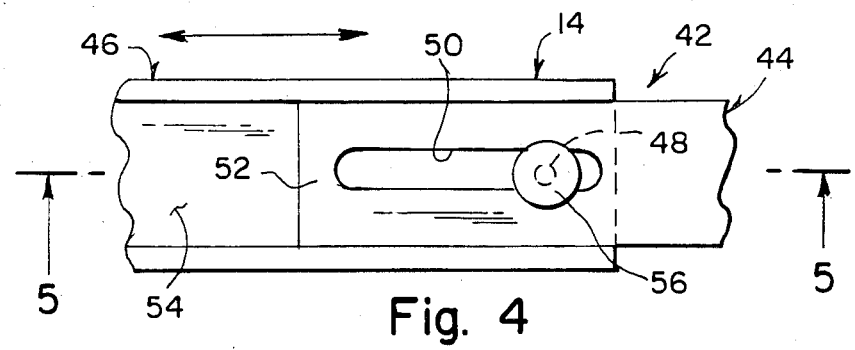
Fig. 4
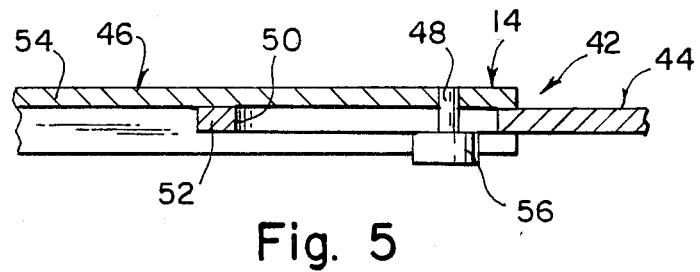
Fig. 5

DISTANCE STICK

BACKGROUND OF THE INVENTION

The instant invention relates generally to safety devices for two wheel vehicles and more specifically it relates to a distance safety stick for a bicycle and the like.

Numerous safety devices for two wheel vehicles have been provided in prior art that are adapted to signal to other vehicles the presence of the two wheel vehicle. For example U.S. Pat. Nos. 3,967,575; 3,982,771 and 4,116,154 all are illustrative of such prior art. While these units may be suitable for the particular purpose to which they address, they would not be suitable for the purposes of the present invention as heretofore described.

SUMMARY OF THE INVENTION

A principle object of the present invention is to provide a distance safety stick for a bicycle and the like that is attached to the seat stay portion of the frame of the bicycle exposed to passing traffic and has a guard arm that can be placed in a horizontally disposed position and a vertically retracted position.

Another object is to provide a distance safety stick for a bicycle and the like that has an arrow shaped reflector portion on the guard arm that is highly visible to vehicles approaching the bicycle.

An additional object is to provide a distance safety stick that has an adjustable guard arm to vary the length of the guard arm.

A further object is to provide a distance safety stick that is simple and easy to use.

A still further object is to provide a distance safety stick that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective side view of a bicycle with the invention in position thereon.

FIG. 2 is a front view of the invention.

FIG. 3 is a cross sectional view taken along line 3—3 in FIG. 2.

FIG. 4 is a partial front view of a modification showing the guard arm being adjustable.

FIG. 5 is a cross sectional view taken along line 5—5 in FIG. 4.

DETAILED DESCRIPTION OF THE PREFERRED EMBODIMENTS

Turning now descriptively to the drawings, in which similar reference characters denote similar elements throughout the several views, FIGS. 1 through 3 illustrates a distance safety stick 10 for a bicycle 12 and the like. The distance safety stick 10 consists of a guard arm 14 and a mounting device 16 for supporting the guard arm 14 in a horizontally disposed position at one side of the bicycle 12 from which position the guard arm 14 may be swung upwardly into a vertically retracted position.

The mounting device 16 includes a C-shaped clamp holder 18 engageable with the bicycle 12 and a L-shaped bracket member 20 supported on the clamp holder 18 for holding the guard arm 14 in the positions of adjustment.

The clamp holder 18 is formed with a set screw 22 for receiving a seat stay portion 24 of frame 26 of the bicycle 12 in secured relationship. The L-shaped bracket member 20 is constructed transversely from rear wall 26 of the clamp holder 18. The rear wall 26 of the clamp holder has a pivot element 28 located transversely therethrough for pivotally supporting the guard arm 14. Horizontal portion 30 of the bracket member 20 is for supporting the guard arm 14 in a horizontally disposed position while vertical portion 32 of the bracket member 20 is for supporting the guard arm 14 in a vertically retracted position.

The guard arm 14 has an arrow shaped reflector portion 34 at free end 36 thereof. The reflector portion 34 has a red rearward facing reflector 38 in indicating the bicycle 12 presence to vehicles approaching from the rear and a yellow forward facing reflector 40 in indicating the bicycle 12 presence to vehicles approaching from the front. The arrow shaped reflector portion 34 especially serves to indicate proximity of vehicles passing the bicycle 12 so that a safe passing clearance may be more readily maintained.

FIGS. 4 and 5 show an adjustment device 42 for increasing length of the guard arm 14. The adjustment device 42 consists of the guard arm 14 being two integrally sliding members 44, 46 and a pin 48.

The first member 44 is flat and has a lateral slot 50 at free end 52 thereof. The second member 46 is C-shaped so that the first member 44 can fit into the second member. The pin 48 extends outwardly from back wall 54 of the C-shaped second member 46 through the slot 50 in the first flat member 44. The pin 48 has an enlarged head 56 to prevent the integrally sliding members 44 and 46 from disengaging.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A distance safety stick for a bicycle and the like comprising a guard arm and a mounting device affixed to the frame of said bicycle for pivotally supporting said guard arm in a horizontally disposed position at one side of said bicycle, said guard arm being adapted to pivot upwardly into a vertically retracted position, said mounting device including a C-shaped clamp holder adjustably mounted on an upwardly extending portion of said frame of said bicycle and an L-shaped bracket member integrally formed with said clamp holder for supporting said guard arm in said positions, said clamp holder having a set screw for engaging said upwardly extending bicycle frame portion at various selected locations, said L-shaped bracket member being constructed to extend transversely from a rear wall of said clamp holder, said rear wall of said clamp holder having a pivot element located transversely therethrough for pivotally supporting said guard arm, a horizontal portion of said L-shaped bracket member supporting said guard arm in said horizontally disposed position while a vertical portion of said L-shaped bracket member supports said guard arm in said vertically retracted position.

2. A distance safety stick as recited in claim 1, wherein said guard arm has an arrow shaped reflector portion at a free end thereof, said reflector portion having a rearward facing reflector for indicating said bicycle presence to vehicles approaching from behind said bicycle and a forward facing reflector for indicating said bicycle presence to vehicles approaching from in front of said bicycle, said arrow shaped reflector portion especially serves to indicate a safe distance for vehicles passing said bicycle so that a safe passing clearance may be more readily maintained.

3. A distance safety stick as recited in claim 2, wherein said guard arm further comprises an adjustment device for increasing and decreasing the length of said guard arm.

4. A distance safety stick as recited in claim 3, wherein said adjustment device comprises two slideably adjustable members, a first member being flat and having a lateral slot at a free end thereof, a second member being C-shaped in cross section so that said first member can slideably fit longitudinally into said second member and a pin extending outwardly from a back wall of said C-shaped second member through said slot in said first flat member, said pin having an enlarged head to prevent said slideably adjustable first and second members from disengaging.

* * * * *